(12) United States Patent
Basak et al.

(10) Patent No.: US 7,529,720 B2
(45) Date of Patent: May 5, 2009

(54) DISTRIBUTED CLASSIFICATION OF VERTICALLY PARTITIONED DATA

(75) Inventors: Jayanta Basak, New Delhi (IN); Ravi Kothari, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 10/811,275

(22) Filed: Mar. 26, 2004

(65) Prior Publication Data

US 2005/0213825 A1    Sep. 29, 2005

(51) Int. Cl.
*G06N 5/00*    (2006.01)
*G06N 7/00*    (2006.01)
(52) U.S. Cl. .............................. 706/46; 706/45; 706/48
(58) Field of Classification Search .................. 706/46, 706/45, 48; 707/200, 6
See application file for complete search history.

(56) References Cited

U.S. PATENT DOCUMENTS 6,708,163 B1 *   3/2004   Kargupta et al. ............... 707/3

OTHER PUBLICATIONS

Vaidy et al., Jaideep, "Privacy-Preserving K-Means Clustering over Vertically Partitioned Data", SIGKDD, Aug. 2003.*
Kothari et al., Ravi, "Learning from Labeled and Unlabeled Data", IEEE, 2002.*
Kothari et al., Ravi, "Learning From Labeled and Unlabeled Data Using a Minimal Number of Queries", IEEE, 2003.*
Du et al., Wenliang, "Building Decision Tree Clasifier on Private Data", IEEE, 2002.*
Vaidya et al., Jaideep, "Privacy-Preserving K-Means Clustering Over Vertically Partitioned Data", ACM, 2003.*
Jacobs, R.A., Jordan, M.I., Nowlan, S.J. and Hinton, G.E, "Adaptive mixtures of local experts", *Neural Computation*, pp. 79 to 87, 1991, vol. 3, No. 1.
Ahmad, S., and Tresp, V., "Some solutions to the missing feature problem in vision", *Proceedings of Advances in Neural Information Processing Systems*, 1993, Hanson, S.J. Cowan, J.D. and Giles, C. L. (Editors), San Mateo, California.

* cited by examiner

*Primary Examiner*—David R Vincent
*Assistant Examiner*—Adrian L Kennedy
(74) *Attorney, Agent, or Firm*—Gibb I.P. Law Firm, LLC

(57) ABSTRACT

Each individual classifier is based on the partial view of the data that is locally available. For the decision made by the classifiers to be consistent, the data sets available to the classifiers are sampled from the same (fixed though unknown) distribution. A test pattern is assumed to be observable across the classifiers. A combined classification is achieved based upon the posterior probabilities computed by, the individual classifiers. The posterior is computed for a test sample based on the posteriors provided by a subset of consistent classifiers.

12 Claims, 3 Drawing Sheets

DISTRIBUTED CLASSIFICATION OF VERTICALLY PARTITIONED DATA

FIELD OF THE INVENTION

The present invention relates to distributed classification of vertically partitioned data.

BACKGROUND

Pattern classification in a distributed environment often involves vertically partitioned data. Vertically partitioned data is data for which each classifier can observe only a subset of the attributes in the data, and the classifiers do not share the data sets between themselves for reasons of privacy and security.

There may be an overlap between the attribute sets available to different classifiers, though each classifier often has knowledge about which overlapped subset of attributes is shared by another classifier. The problem arises of how to make a classification decision based on the decisions made by the local classifiers.

The mixture-of-experts framework (described in Jacobs, R. A., Jordan, M. I., Nowlan, S. J., and Hinton, G. E., "Adaptive mixtures of local experts", *Neural Computation,* 1991, volume 3, no. 1, pages 79 to 87) proposes that each expert solve a simpler problem, and the combination of the outputs of the individual experts, provide a solution to the more complex problem. Though typically each expert in such a mixture-of-experts framework "sees" the entire input, each expert can conceivably observe certain features and the entire framework is usable even when data is vertically partitioned.

Each expert in a mixture-of-experts framework partitions the input space and establishes local regression surfaces in each partition. When used with vertically partitioned data, such regression surfaces are defined over regions of a subspace, and there is no guarantee that the approximation is close to the desired approximation (unless the function to be approximated is separable).

Inducing a classifier with vertically partitioned data may also be viewed from the perspective of missing data. A classifier induced from the features in a data partition may view the unobserved features as features whose value is always missing. Ahmad et al (Ahmad, S., and Tresp, V., "Some solutions to the missing feature problem in vision", *Proceedings of Advances in Neural Information Processing Systems,* 1993, Hanson, S. J. Cowan, J. D. and Giles, C. L. (Editors), San Mateo, Calif.) describe computing the posterior probabilities by "marginalizing out" the missing features. Usually, such an approach is useful when the amount of missing information is small and the available information can, for the most part, constrain the class label. For vertically partitioned data, however, the information available to each classifier is small. That is, the number of observed features is often a small fraction of the total number of features.

Accordingly, improved techniques for distributed classification of vertically partitioned data are desirable.

SUMMARY

The techniques described herein relate to pattern classification in a distributed environment where the data sets are vertically partitioned, in which each classifier can observe only a subset of the attributes in the data, and the classifiers do not share the data sets between themselves for reasons of privacy and security. There can be overlap between the attributes available to different classifiers. One can also assume that each classifier has knowledge of which overlapped subset of attributes is shared by other classifiers.

A classification decision is obtained based on the decisions made by the local classifiers, without imposing any master-slave configuration. In other words, no processor is able to "see" the entire data set.

Each individual classifier is based on the partial view of the data that is available. Correspondence of the patterns in the different data sources is not necessary—a classifier is constructed based on the locally available data. For the decision made by the classifiers to be consistent, the data sets available to the classifiers are sampled from the same (fixed though unknown) distribution.

A test pattern is assumed to be observable across the classifiers. In the design of classifiers, a set of patterns is used to design the parametric or non-parametric classifier and this set of patterns is called the training set. The performance of the classifier is tested with another set of patterns, and this set is called test set. Any pattern in the training set is a training pattern and any pattern in the test set is a test pattern. Therefore, when a classifier is used every pattern is a test pattern for the classifier.

The combined classification is based upon using the posterior probabilities computed by the individual classifiers. For a test sample, the overall posterior probability is approximated by combining the posterior probabilities provided by a subset of consistent classifiers. The combined posterior is obtained for a test pattern for each class, as described herein. The test pattern is assigned to the class for which the combined posterior is maximum. A classifier can compute the posterior for test sample using various existing techniques, using parametric or non-parametric techniques, for example.

DETAILED DESCRIPTION

Figure 1:
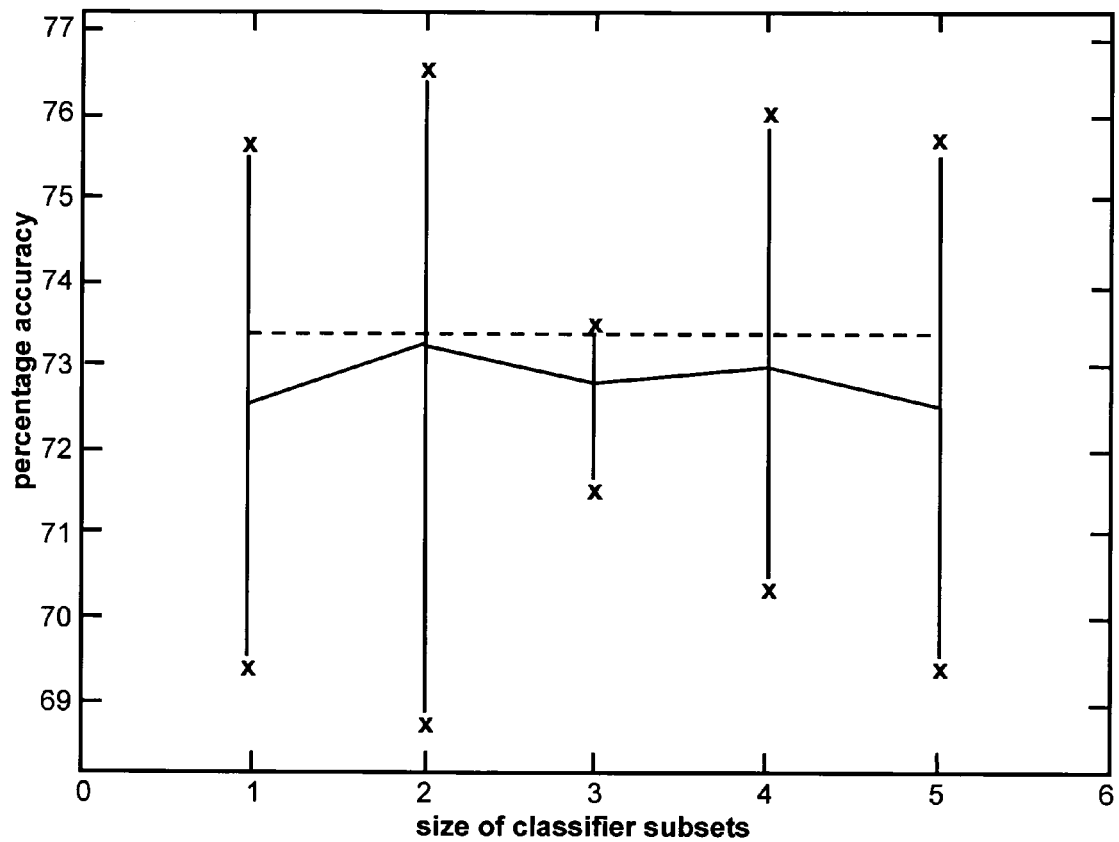
FIGS. 1 and 2 are graphs that represent the results for different sizes of the chosen classifier groups for respective data sets.

Consider q independent observers of a phenomenon. The i-th observer records events pertaining to the phenomenon in terms of a set of features or attributes $F_i$. The entire feature set is given as $F=F_1 \cup F_2 \cup \ldots \cup F_q$. The partial view recorded by each observer may be interpreted within a non-distributed approach by visualizing that a data set in which each row comprises a pattern is vertically (column-wise) partitioned into q (possibly overlapping) partitions.

Let the (partial) view of a pattern x as viewed by the i-th observer be denoted by $x_{F_i}$. More specifically, let $x_{F_i}$ denote the vector representation of a pattern x comprising the features of pattern x present in $F_i$. Associated with each observer i is a classifier $C_i$ constructed on the basis of $x_{F_i}$. The class label of a test pattern x is thus to be determined.

Each classifier produces the a posterior probability computed on the basis of the partial view available to the classifier. Let $p(\omega_j|x_{F_i})$ denote the posterior probability for class $\omega_j$ as determined by classifier i based on a partial view of x (that is, $x_{F_i}$). A decision is made based on the output of the individual classifiers. One estimates the posterior probability based on the posterior probabilities estimated by the individual classifiers. One approximation technique by which the overall posterior probability can be estimated is presented in Equation [1] below. If those features that are not visible by more than one classifier are "marginalized out", then the overall posterior probability is approximated according to Equation [1] below.

Term "marginalised out" is used in relation to the marginal density. The feature set is viewed as the collection of feature subsets. The term "feature" is synonymous with the term "attribute". Each pattern is characterized by a fixed set of attributes. Thus, if a feature subset is allocated only to a single classifier, and is not allocated to any other classifier in Equation [1] below, then the posterior corresponding to that feature subset does not appear in any term in the denominator and the numerator except the posterior predicted by that classifier only. The feature subset is accordingly marginalised out.

If the feature subset being marginalized out is highly informative, and deleting that subset causes a decrease in the posterior, then the classifier behaves consistently with others according to the definition of consistency in Equation [2] below. On the other hand, if the feature subset is redundant, or "noisy", such that inclusion of the feature subset causes a decrease in the posterior, then the classifier becomes inconsistent with respect to other classifiers as governed by Equation [2] below.

$$\tilde{P}(\omega_i \mid x) = \frac{\left(\prod_k P(\omega_i \mid x_{F_k})\right)\left(\prod_{k,l,m} P(\omega_i \mid x_{F_k \cap F_l \cap F_m})\right)\dots}{\left(\prod_{k,l} P(\omega_i \mid x_{F_k \cap F_l})\right)\left(\prod_{k,l,m,n} P(\omega_i \mid x_{F_k \cap F_l \cap F_m \cap F_n})\right)\dots} \quad [1]$$

In Equation [1] above $P(\omega_j \mid x_{F_k \cap F_l \cap F_m})$ denotes the posterior probability for class $\omega_j$ based on the feature subset $F_k \cap F_l \cap F_m$, and $x_{F_k \cap F_l \cap F_m}$ is the corresponding view of x. $\tilde{P}$ is the approximated posterior probability.

A classifier $C_i$ is referred to as consistent for a pattern x if there exists some class label $\omega$ that is true for the expressions of Equation [2] below and for the subsequent intersection subsets of attributes.

$P(\omega \mid x_{F_i}) \geq P(\omega' \mid x_{F_i})$ for all $\omega' \neq \omega$, and $P(\omega \mid x_{F_i}) \geq P(\omega \mid x_{F_i \cap F_j})$ for all $F_j$, $P(\omega \mid x_{F_i \cap F_j}) \geq P(\omega \mid x_{F_i \cap F_j \cap F_k})$ for all $F_j$ and $F_k$, $P(\omega \mid x_{F_i \cap F_j \cap F_k}) \geq P(\omega \mid x_{F_i \cap F_j \cap F_k \cap F_l})$ for all $F_j$, $F_k$ and $F_l$, [2]

In Equation [2] above, j represents another classifier in the set such that $F_i \cup F_j \supset F_i$ and $F_i \cap F_j \neq \phi$. The Bayesian framework of deriving the approximate posterior is valid only for the set of consistent classifiers.

If all classifiers for the vertically partitioned datasets are consistent then the overall classification score can be computed from Equation [1]. Overall approximated posterior is computed for a test pattern based only on the classifiers, which are consistent and the inconsistent classifiers are ignored. If, for a pattern, no classifier is consistent then only the product of the posteriors of all classifiers is taken.

All possible subsets of classifiers are considered. One classifier is considered at a time, then subsets of two classifiers are considered at a time, and so on. For each subset of classifiers, the classifier subset is found to be consistent for some class label $\omega$. A subset C of classifiers is said to be mutually consistent if the condition in Equation [2] is true for all i, j, k, 1 ... $\in$ C. If a subset of classifiers is consistent then the overall posterior of a sample for that consistent subset is estimated from Equation [1].

All possible consistent subsets are considered, and the posteriors for each class label are combined by (i) the product of estimated posteriors (from Equation (1)) of the consistent subsets (from Equation [2]), and (ii) the maximum of the estimated posteriors of the consistent subsets. The class label is assigned to a test pattern for which the combined posterior is maximum. The class label is a label attached to a pattern to signify the class to which the pattern belongs.

EXAMPLE

Two "real-life" data sets are described with accompanying results. The two example data is sets are drawn from diagnostic breast cancer data (FIG. 1), and diabetes incidence data (FIG. 2).

First, the attribute set is partitioned into several subsets of attributes. The way the attribute set is partitioned is random considering a certain maximum percentage of overlap that can happen between the different subsets of attributes. The partitioning may alternatively be constrained in a variety of ways, as required. Conversely, partitioning can also be done randomly to demonstrate that the technique is generic in nature. Satisfactory results can be achieved for any random partition. The subsets are not necessarily non-overlapping.

For each subset of attributes, one classifier is partitioned such that if there are n such subsets, then there are n classifiers. Each classifier is independent of the other one. Thus, one classifier cannot be used to determine how other classifiers works, and what data are determine available to the classifier. This can be a requirement for privacy reasons.

When a new pattern (that is, a test pattern) is given each classifier can view only certain parts of the test pattern depending on which attributes are available to the classifier. Note that, the data sets are partitioned into training and test sets, as is performed in testing any classification method.

All possible groups of classifiers are considered for a given group size. For example, if there are 10 classifiers and a group size is 2, then there are 45 possible groups of classifiers. Similarly, if the group size is 3 then there are 120 possible groups. For a group size of 9 there are again 45 possible groups. In general for a group size of k, there are n-choose-k combinations.

For each group of classifiers, a check is made of whether or not the group is consistent for a given test pattern. A group of classifiers is termed consistent if the member classifiers are consistent with each other for a given test pattern.

The estimated posterior for each group of consistent classifiers is determined as described herein. Each estimated posterior is then combined using the product of estimated posteriors. The combination can be obtained by various other methods such as the maximum of the estimated posteriors or sum of the estimated posteriors. The product of the estimated posteriors generally provides better results.

For the example data sets used herein, the attribute is randomly partitioned set into 8 subsets (for the diagnostic breast cancer data of FIG. 1, with 30 attributes) and 5 subsets (for the diabetes incidence data of FIG. 2, with 8 attributes). The experiment is run for 10 trials.

Figure 2:
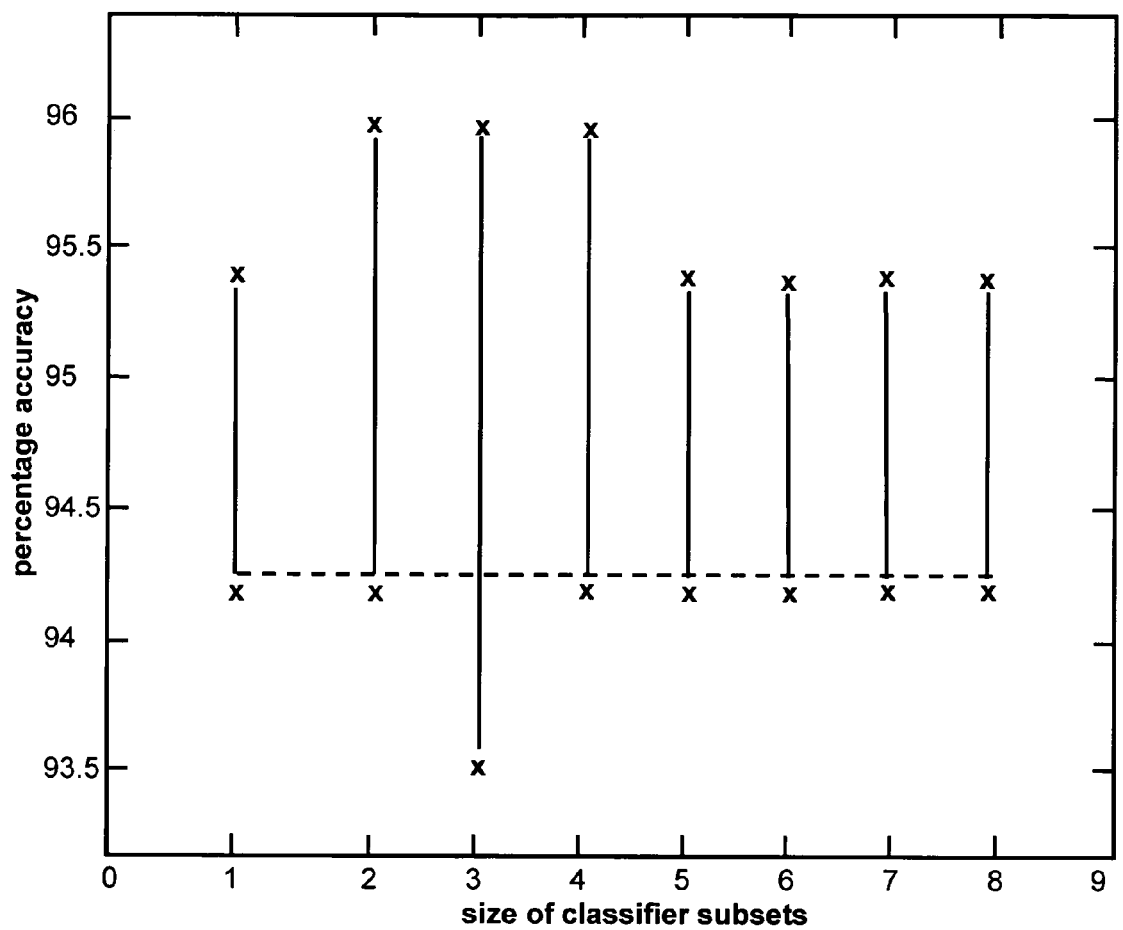

FIGS. 1 and 2 illustrate the best and worst results for different sizes of the chosen classifier groups, and the average performance of the chosen sizes of classifier groups. The y-axis of FIGS. 1 and 2 represents the percentage accuracy of the vertical partitioning classification technique, while the x-axis represents the size of the group of classifiers used in vertical partitioning. As a reference, results are also indicated without any vertical partitioning by a dashed line. The results show that even after partitioning, the degradation in performance is not significant The k-NN classifier is used in all cases. Any other classifier can also be used for this purpose, provided that this classifier can also approximate the posterior probability.

Computer Hardware

Figure 3:
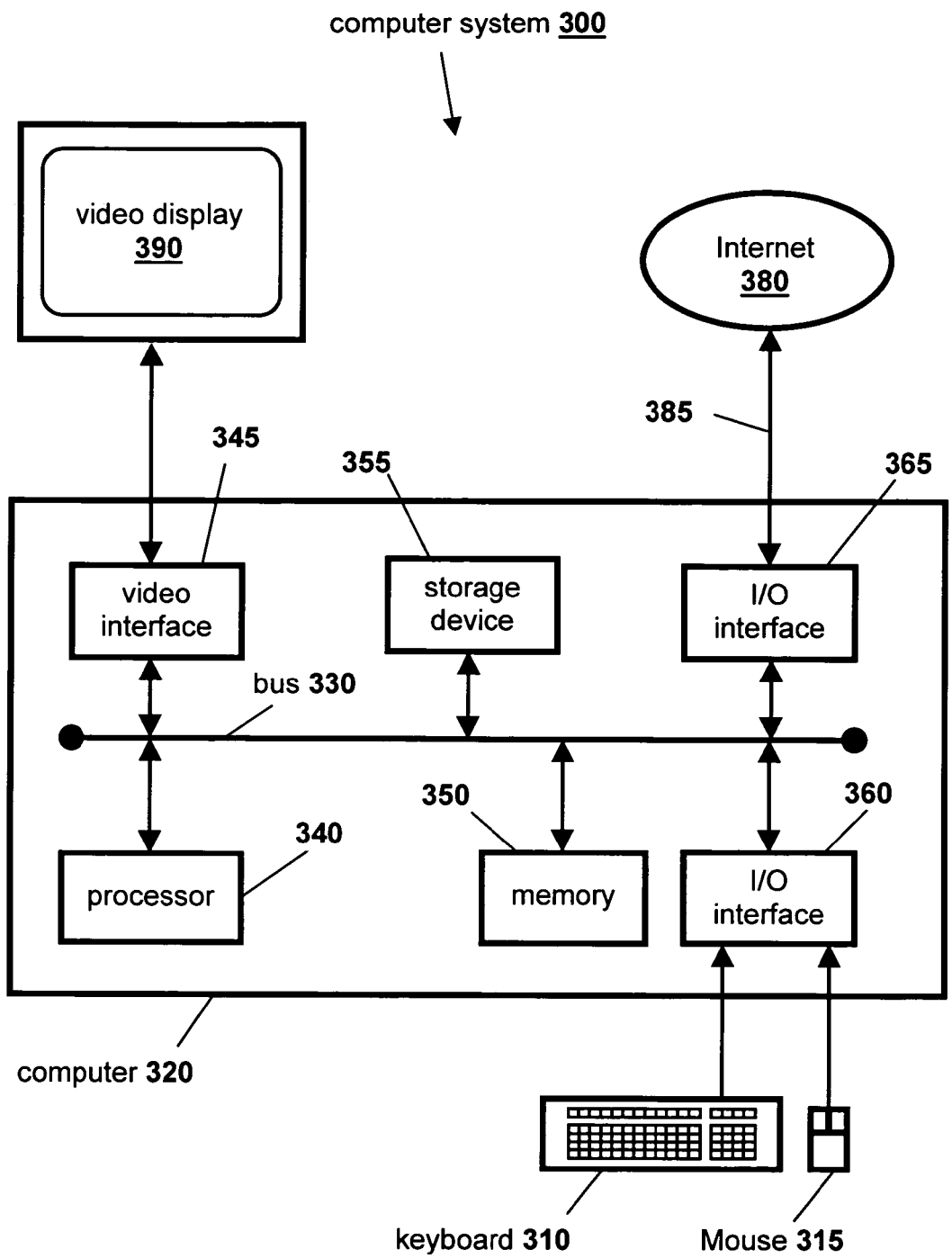
FIG. 3 is a schematic representation of a computer system suitable for performing the techniques described herein.

FIG. 3 is a schematic representation of a computer system 300 of a type that is suitable for executing computer software for distributed classification of vertically partitioned data. Computer software executes under a suitable operating system installed on the computer system 300, and may be thought of as comprising various software code means for achieving particular steps.

The components of the computer system 300 include a computer 320, a keyboard 310 and mouse 315, and a video display 390. The computer 320 includes a processor 340, a memory 350, input/output (I/O) interfaces 360, 365, a video interface 345, and a storage device 355.

The processor 340 is a central processing unit (CPU) that executes the operating system and the computer software executing under the operating system. The memory 350 includes random access memory (RAM) and read-only memory (ROM), and is used under direction of the processor 340.

The video interface 345 is connected to video display 390 and provides video signals for display on the video display 390. User input to operate the computer 320 is provided from the keyboard 310 and mouse 315. The storage device 355 can include a disk drive or any other suitable storage medium.

Each of the components of the computer 320 is connected to an internal bus 330 that includes data, address, and control buses, to allow components of the computer 320 to communicate with each other via the bus 330.

The computer system 300 can be connected to one or more other similar computers via a input/output (I/O) interface 365 using a communication channel 385 to a network, represented as the Internet 380.

The computer software may be recorded on a portable storage medium, in which case, the computer software program is accessed by the computer system 300 from the storage device 355. Alternatively, the computer software can be accessed directly from the Internet 380 by the computer 320. In either case, a user can interact with the computer system 300 using the keyboard 310 and mouse 315 to operate the programmed computer software executing on the computer 320.

Other configurations or types of computer systems can be equally well used to execute computer software that assists in implementing the techniques described herein.

CONCLUSION

Various alterations and modifications can be made to the techniques and arrangements described herein, as would be apparent to one skilled in the relevant art.

We claim:

1. A method for classifying vertically partitioned medical data comprising:
   categorizing subsets of classifiers for the partitioned medical data;
   determining class labels for a data pattern of the partitioned medical data for which the subsets of classifiers are consistent;
   estimating posterior probabilities for the class labels of consistent classifier subsets;
   approximating the overall posterior probability of the partitioned medical data based upon the estimated posterior probabilities of the consistent classifier subsets;
   determining the mutual consistency of each classifier with respect to the other classifiers in a classifier subset;
   producing a combined classification based upon said overall posterior probability; and
   outputting said combined classification to a display to classify said vertically partitioned medical data for maintaining medical data privacy.

2. The method as claimed in claim 1, further comprising using a predetermined consistency condition for a classifier with respect to other classifiers.

3. The method as claimed in claim 1, wherein the posterior probability is approximated from the estimated posterior probabilities using a Bayesian framework.

4. The method as claimed in claim 1, wherein the class label is selected for test data for which a combined posterior probability is maximum.

5. A computer program product comprising a computer-readable medium storing instructions executable by a computer for classifying partitioned medical data, in a method comprising:
   categorizing subsets of classifiers for the partitioned medical data;
   determining class labels for a data pattern of the partitioned medical data for which the subsets of classifiers are consistent;
   estimating posterior probabilities for the class labels of consistent classifier subsets;
   approximating the overall posterior probability of the partitioned medical data based upon the estimated posterior probabilities of the consistent classifier subsets;
   determining the mutual consistency of each classifier with respect to the other classifiers in a classifier subset;
   producing a combined classification based upon said overall posterior probability; and
   outputting said combined classification to a display to classify said vertically partitioned medical data for maintaining medical data privacy.

6. A computer system comprising a computer-readable medium storing computer software code means instructions executable by a computer for classifying partitioned data comprising:
   computer software code means for categorizing subsets of classifiers for the partitioned data;
   computer software code means for determining class labels for a data pattern of the partitioned data for which the classifier subsets are consistent;
   computer software code means for estimating posterior probabilities for the class labels of consistent classifier subsets;
   computer software code means for approximating the overall posterior probability of the partitioned data based upon the estimated posterior probabilities of the consistent classifier subsets;
   computer software code means for determining the mutual consistency of each classifier with respect to the other classifiers in a classifier subset;
   computer software code means for producing a combined classification based upon said overall posterior probability; and
   computer software code means for outputting to a display said combined classification to classify said vertically partitioned data.

7. The computer program product as claimed in claim 5, further comprising using a predetermined consistency condition for a classifier with respect to other classifiers.

8. The computer program product as claimed in claim 5, wherein the posterior probability is approximated from the estimated posterior probabilities using a Bayesian framework.

9. The computer program product as claimed in claim 5, wherein the class label is selected for test data for which a combined posterior probability is maximum.

10. The computer system as claimed in claim 6, further comprising computer software code means for using a predetermined consistency condition for a classifier with respect to other classifiers.

11. The computer system as claimed in claim 6, wherein the posterior probability is approximated from the estimated posterior probabilities using a Bayesian framework.

12. The computer system as claimed in claim 6, wherein the class label is selected for test data for which a combined posterior probability is maximum.

* * * * *